United States Patent
Qiu et al.

(10) Patent No.: US 8,373,400 B2
(45) Date of Patent: Feb. 12, 2013

(54) SYSTEM AND METHOD FOR SMOOTHING MODE TRANSITIONS IN A VOLTAGE SUPPLY

(75) Inventors: Weihong Qiu, San Jose, CA (US); Jun Liu, San Jose, CA (US); Shangyang Xiao, Daly City, CA (US)

(73) Assignee: Intersil Americas Inc., Milpitas, CA (US)

( * ) Notice: Subject to any disclaimer, the term of this patent is extended or adjusted under 35 U.S.C. 154(b) by 195 days.

(21) Appl. No.: 12/876,299

(22) Filed: Sep. 7, 2010

(65) Prior Publication Data

US 2011/0062926 A1   Mar. 17, 2011

Related U.S. Application Data

(60) Provisional application No. 61/242,753, filed on Sep. 15, 2009.

(51) Int. Cl.
   G05F 1/56 (2006.01)
   G05F 1/569 (2006.01)
   G05F 1/575 (2006.01)

(52) U.S. Cl. ..................... 323/282; 323/285

(58) Field of Classification Search .......... 323/223–224, 323/243–244, 246, 266–271, 282–286, 288, 323/351, 356
   See application file for complete search history.

(56) References Cited

U.S. PATENT DOCUMENTS

| | | | | |
|---|---|---|---|---|
| 5,905,370 A * | 5/1999 | Bryson | ................ | 323/283 |
| 5,943,227 A * | 8/1999 | Bryson et al. | ................ | 363/95 |
| 7,030,596 B1 * | 4/2006 | Salerno et al. | ................ | 323/282 |
| 7,221,129 B2 * | 5/2007 | Matsuo et al. | ................ | 323/222 |
| 7,265,523 B2 * | 9/2007 | Dowlatabadi | ................ | 323/222 |
| 7,382,114 B2 * | 6/2008 | Groom | ................ | 323/271 |
| 7,495,424 B1 * | 2/2009 | Mei et al. | ................ | 323/284 |
| 7,567,065 B2 * | 7/2009 | Matsuo et al. | ................ | 323/222 |
| 2007/0216388 A1 * | 9/2007 | Sohma | ................ | 323/284 |
| 2008/0061758 A1 * | 3/2008 | Nishida | ................ | 323/284 |
| 2009/0058388 A1 * | 3/2009 | Kanakubo | ................ | 323/288 |
| 2009/0079408 A1 * | 3/2009 | Qiao et al. | ................ | 323/283 |
| 2009/0218994 A1 * | 9/2009 | Liu et al. | ................ | 323/234 |
| 2010/0134079 A1 * | 6/2010 | Liu et al. | ................ | 323/282 |

* cited by examiner

Primary Examiner — Adolf Berhane
Assistant Examiner — Nusrat Quddus
(74) Attorney, Agent, or Firm — Fogg & Powers LLC

(57) ABSTRACT

A system, voltage supply circuit, control unit for a voltage supply circuit, and method of controlling a voltage supply circuit are disclosed. For example, a system is disclosed that comprises at least one electronic circuit and a voltage supply unit coupled to an input of the at least one electronic circuit. The voltage supply unit includes a power unit to supply a voltage to the at least one electronic circuit and a control unit to control an operating mode of the power unit, an output of the control unit coupled to an input of the power unit. The control unit includes a mode selector to select the operating mode of the power unit, coupled to at least a first output of the power unit, an amplifier coupled to the at least a first output of the power unit, a compensation circuit, and a first switching unit coupled to the mode selector and the compensation circuit, to couple the compensation circuit to the amplifier if a selected operating mode of the power unit is a first mode.

30 Claims, 3 Drawing Sheets

SYSTEM AND METHOD FOR SMOOTHING MODE TRANSITIONS IN A VOLTAGE SUPPLY

CROSS REFERENCE TO RELATED APPLICATIONS

This application is related to U.S. Provisional Patent Application Ser. No. 61/242,753 entitled "COMPENSATED BURST MODE CONTROL," filed on Sep. 15, 2009 and incorporated herein by reference. This application hereby claims to the benefit of U.S. Provisional Patent Application Ser. No. 61/242,753.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
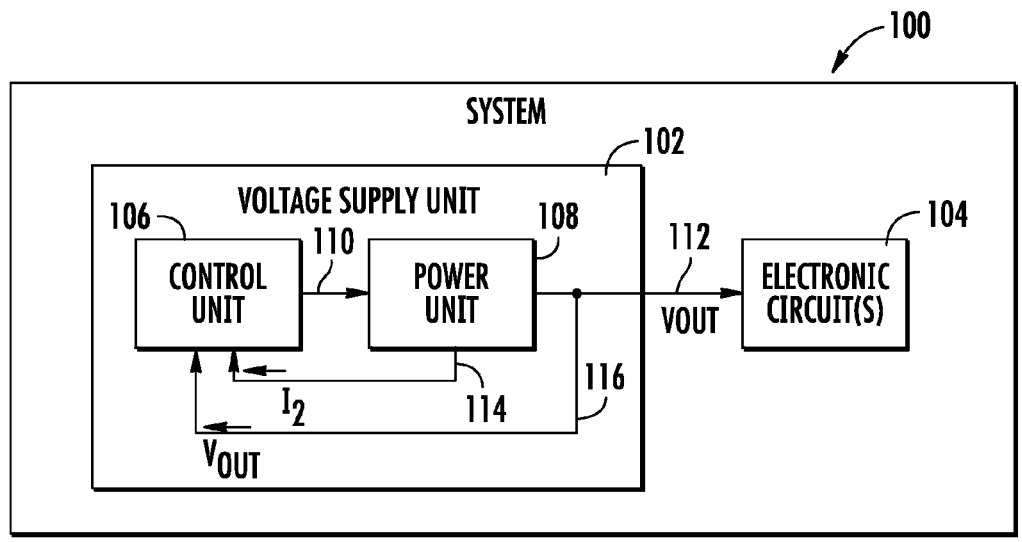
FIG. 1 is a block diagram showing a system that can be utilized to implement one embodiment of the present invention.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense.

FIG. 1 is a block diagram showing a system 100, which can be utilized to implement one embodiment of the present invention. Essentially, system 100 can be any suitable electronic or electrical system and/or device that utilizes DC power to operate. For example, system 100 can be a general purpose computer, Personal Computer (PC), signal or data communication system, mobile phone, Personal Digital Assistant (PDA), portable music player, battery charging system, plug-and-play system, or system that operates in accordance with the Universal Serial Bus (USB) protocol. As another example, in one embodiment, system 100 includes a voltage supply circuit that converts a DC supply voltage to a lower value, regulated DC voltage, which can be utilized to power one or more Integrated Circuits (ICs).

Referring to FIG. 1, system 100 includes a voltage supply unit 102 and one or more electronic circuit(s) 104. For example, the one or more electronic circuits 104 can be a Central Processing Unit (CPU), multiprocessor unit, Random Access Memory (RAM), Read Only Memory (ROM), hard drive, mass storage unit, display unit, Input/Output (I/O) unit, transmitting unit, receiving unit, Intermediate Frequency (IF) unit, signal processing unit, audio processor unit, data processor unit, communication bus, or rechargeable battery and the like. Also, for example, in one embodiment, voltage supply unit 102 can be a switching voltage regulator, such as a voltage regulator for a switched mode power supply, buck converter, or voltage step-down converter and the like. Voltage supply unit 102 includes a control unit with switchable compensation circuit 106 (hereinafter, "control unit 106") and a power unit 108. An output of control unit 106 is coupled to an input of power unit 108 by a control line 110. An output (Vout) of power unit 108 is coupled to one or more electronic circuit(s) 104 by line 112, and also to an input of control unit 106 by a voltage feedback line 116. A second output of power unit 108 is coupled to a second input of control unit 106 by a current feedback line 114 ($I_2$). Consequently, utilizing voltage and current feedback from power unit 108, control unit 106 can control the mode of operation of power unit 108 (and voltage supply unit 102).

For example, control unit 106 causes power unit 108 to operate in a Pulse Width Modulation (PWM) mode if power unit 108 is driving a normal or heavy load, or a Pulse-Frequency Modulation (PFM) mode (also referred to as a "Burst Mode") if power unit 108 is driving a light load. Note that the terms "light load", "normal load", or "heavy load" are terms of art, and their actual values are merely design constraints. In any event, utilizing the voltage and current feedback signals received from power unit 108, control unit 106 is capable of smoothing out operational transitions from the PFM mode to the PWM mode, and thereby minimizing undesirable output voltage "dips" (decreases) or "bumps" (increases). In this regard, in accordance with the present invention, control unit with switchable compensation circuit 106 is utilized to provide compensated burst mode control in voltage supply unit 102.

Figure 2:
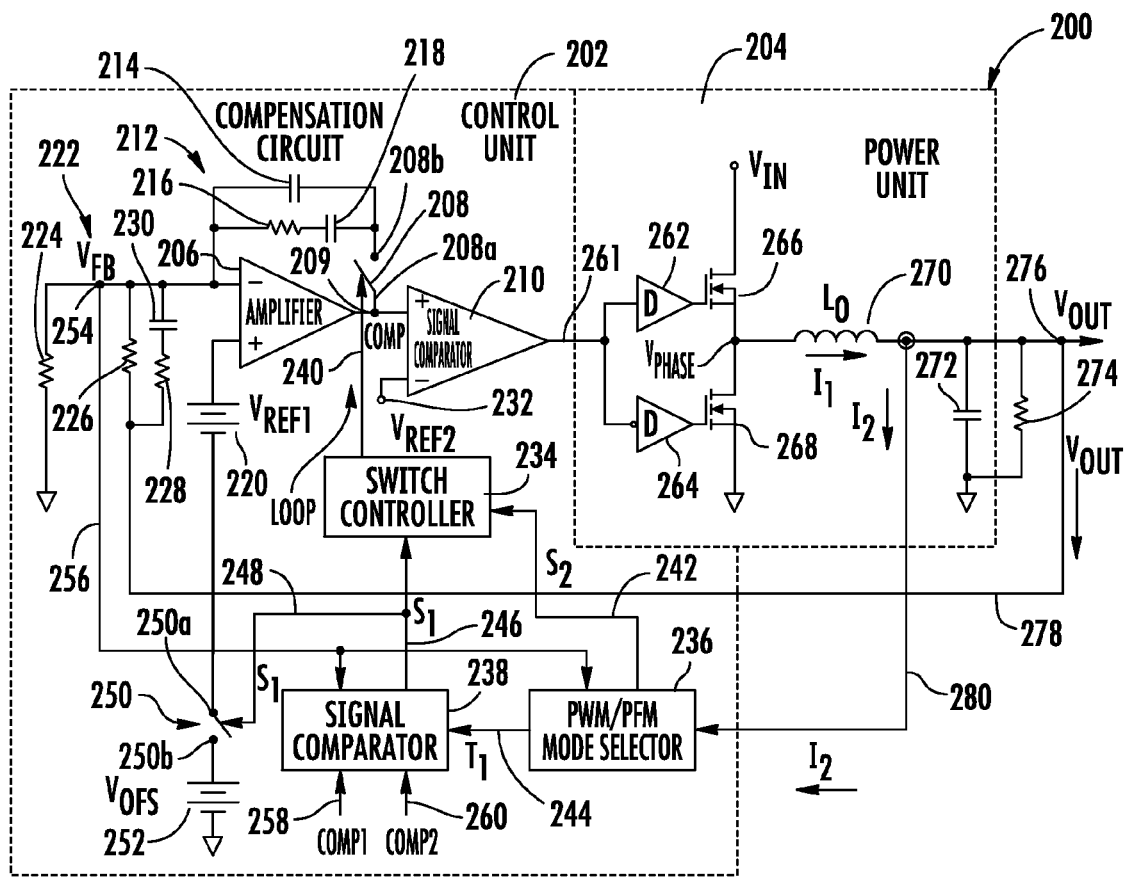
FIG. 2 is a schematic diagram of a voltage supply circuit that can be utilized to implement one embodiment of the present invention.

FIG. 2 is a schematic block diagram of a voltage supply circuit 200, which can be utilized to implement one embodiment of the present invention. For example, voltage supply circuit 200 can be utilized to implement voltage supply unit 102 shown in FIG. 1. As such, in one embodiment, voltage supply circuit 200 can be a switching voltage regulator, such as a voltage regulator for a switched mode power supply, buck converter, or voltage step-down converter and the like. Also, in one embodiment, voltage supply circuit 200 can be implemented as an Integrated Circuit (IC) utilizing, for example, a Complementary Metal-Oxide Semiconductor (CMOS) manufacturing technology. However, in other embodiments, voltage supply circuit 200 can be implemented utilizing one or more ICs and one or more discrete, electronic components or devices (e.g., inductor, transistor, etc.).

Referring to FIG. 2, voltage supply circuit 200 includes a control unit 202 and a power unit 204. For example, control unit 202 and power unit 204 can be utilized to implement, respectively, control unit 106 and power unit 108 shown in FIG. 1. Control unit 202 includes a signal amplifier 206. An output of signal amplifier 206 is coupled to a first contact 208a of a first switching unit 208, a node COMP 209, and a first (e.g., positive) input of a first signal comparator 210. A second contact 208b of first switching unit 208 is coupled to one side of a compensation circuit 212, which is composed of capacitors 214, 218 and a resistor 216. A second side of compensation circuit 212 is coupled to a first (e.g., negative) input of amplifier 206 and a voltage divider network 222, which is composed of resistors 224, 226, 228 and a capacitor 230. A second (e.g., positive) input of amplifier 206 is coupled to a positive terminal of a first reference voltage supply ($V_{REF1}$) 220. A second (e.g., negative) input of first signal comparator 210 is coupled to a second reference voltage supply ($V_{REF2}$) 232. Note that components surrounding first signal comparator 210 provide a hysteresis band, which ensures that no false triggering or jittering of first signal comparator 210 occurs if there is noise in the signal at node COMP 209 or the voltage from second reference voltage supply ($V_{REF2}$) 232.

Control unit 202 also includes a switch controller 234, a mode selector unit 236, and a second signal comparator 238. An output of switch controller 234 is coupled to a control input of first switching unit 208 via a control line (LOOP) 240. Also, a first output of mode selector 236 is coupled to a first input of switch controller 234 via a control line 242, and a second output of mode selector 236 is coupled to a first input of second signal comparator 238 via a control line 244. An output of second signal comparator 238 is coupled to a second input of switch controller 234 via a control line 246, and to a control input of a second switching unit 250 via a control line 248. A first contact 250a of second switching unit 250 is coupled to a negative terminal of first reference voltage supply ($V_{REF1}$) 220, and a second contact 250b of second switching unit 250 is coupled to a positive terminal of an offset voltage supply ($V_{OFS}$) 252. The negative terminal of offset voltage supply ($V_{OFS}$) 252 is coupled to circuit ground. A voltage feedback ($V_{FB}$) node 254 in voltage divider network 222 is coupled to a second input of second signal comparator 238 and a second input of mode selector 236 via line 256. A first compensation threshold signal ($COMP_1$) 258 is coupled to a third input of second signal comparator 238 via a line 258, and a second compensation threshold signal ($COMP_2$) 260 is coupled to a fourth input of second signal comparator 238 via a line 260. The values of compensation threshold signals 258, 260 are predefined. In one embodiment, the value of second compensation threshold signal 260 ($COMP_2$) is greater than the value of first compensation threshold signal 258 ($COMP_1$).

Power unit 204 includes a first driver 262 and a second driver 264. An output of first signal comparator 210 in control unit 202 is coupled to an input of first driver 262 and an inverted input of second driver 264 via line 261. For example, line 261 can be utilized to implement line 110 shown in FIG. 1. An output of first driver 262 is coupled to the control gate of a first transistor 266, and an output of second driver 264 is coupled to the control gate of a second transistor 268. In one embodiment, each transistor 266, 268 can be, for example, a P-type MOS Field Effect Transistor (MOSFET). In a second embodiment, transistor 266 can be a P-type transistor, and transistor 268 can be an N-type transistor, or vice versa. In a third embodiment, each transistor 266, 268 can be an N-type transistor. In any event, note that the type of transistor utilized to implement transistors 266, 268 is merely a design constraint. However, if two N-type or two P-type transistors are utilized for transistors 266, 268, then one of drivers 262, 264 should be an inverting type. The drain of first transistor 266 is coupled to a supply voltage (Vin). The source of first transistor 266 is coupled to the drain of second transistor 268 and a first terminal of an inductor 270. The source of second transistor 268 is coupled to circuit ground. The second terminal of inductor 270 is connected to a first side of a capacitor 272 and a resistor 274, and the second side of capacitor 272 and resistor 274 is coupled to circuit ground. Note that in one embodiment, resistor 274 is utilized as an external load. Consequently, resistor 274 is shown external to power unit 200 in FIG. 2. An output connection ($V_{OUT}$) 276 of power unit 204 (and voltage supply circuit 200) is coupled to the second side of resistor 226 and resistor 228 via a voltage feedback ($V_{FB}$) line 278. Also, the second terminal of inductor 270 is coupled to a second input of mode selector 236 via a current feedback ($I_2$) line 280. For example, voltage feedback ($V_{FB}$) line 278 and current feedback ($I_2$) line 280 can be utilized to implement, respectively, voltage feedback line 116 and current feedback line 114 shown in FIG. 1.

Essentially, amplifier 206 and resistors 224, 226 in voltage divider network 222 form part of a feedback loop that is utilized to maintain the output voltage, $V_{OUT}$, nearly equal to the first reference voltage, $V_{REF1}$, and thus provide stability in the feedback loop involved. Also, voltage supply circuit 200 is adapted to operate in a PFM (Burst) mode if power unit 204 is driving a light load, or a PWM mode if power unit 204 is driving a normal or heavy load. As mentioned earlier, note that the terms "light load", "normal load", or "heavy load" are terms of art, and their actual values are merely design constraints.

In operation, the output voltage ($V_{OUT}$) 276 is coupled to feedback node 254 via line 278. Resistors 224, 226 divide the output voltage ($V_{OUT}$) 276 to generate a suitable voltage feedback signal ($V_{FB}$) at node 254. The voltage feedback signal, $V_{FB}$, at node 254 is coupled to an input of signal amplifier 206, second signal comparator 238, and mode selector 236. At the same time, the current, $I_1$, flowing through inductor 270 varies inversely proportionally to changes in the resistance of the (e.g., externally supplied) load resistor 274. A feedback current, $I_2$, which is selected to be a suitable fraction of current $I_1$, is coupled to an input of mode selector 236. Consequently, mode selector 236 is enabled to monitor and utilize the voltage feedback signal, $V_{FB}$, and the current feedback signal, $I_2$, to determine the operational mode of voltage supply circuit 200. Note that, in another embodiment, a processing unit (e.g., microprocessor) can be utilized to monitor a signal indicating the magnitude of the load, and output a suitable signal (associated with the magnitude of the load) to mode selector 236, which enables mode selector 236 to determine the operational mode of voltage supply circuit 200.

Mode selector 236 receives the feedback voltage, $V_{FB}$, and the feedback current, $I_2$, and utilizes their values to determine if the resistance of load resistor 274 is less than or equal to a predefined value (e.g., a resistance value associated with a "normal" load). If the resistance of load resistor 274 is less than or equal to the predefined value, mode selector 236 sends a control signal, $T_1$, to second signal comparator 238 that turns off second signal comparator 238. Also, mode selector 236 sends an "assert" signal, $S_2$, to switch controller 234, which causes first switching unit 208 to close (e.g., couples contact 208a to contact 208b) and thus causes voltage supply circuit 200 to operate in a PWM mode.

Operating voltage supply circuit 200 in the PWM mode, signal amplifier 206 amplifies a difference voltage (e.g., difference between the voltage feedback signal, $V_{FB}$, and the first reference voltage, $V_{REF1}$) and supplies the amplified difference voltage to first signal comparator 210. In turn, first signal comparator 210 compares the amplified difference voltage received from signal amplifier 206 with second reference voltage $V_{REF2}$ (e.g., a voltage "ramp"). If the amplified difference voltage is greater than the second reference voltage ($V_{REF2}$), first signal comparator 210 outputs a suitable signal that causes first transistor 266 to conduct and thereby supply current to inductor 270. Alternatively, if the amplified difference voltage is less than or equal to the second reference voltage ($V_{REF2}$), first signal comparator 210 outputs a suitable signal that causes second transistor 268 to conduct and thereby withdraw current from inductor 270. Consequently, the output signal from first signal comparator 210 is utilized to control the magnitude of the inductor current, $I_1$, and the output voltage, Vout.

If mode selector 236 receives the feedback voltage, $V_{FB}$, and feedback current, $I_2$, and determines that the resistance of load resistor 274 is greater than the predefined value (e.g., a resistance value associated with a "light" load), mode selector 236 sends a control signal, $T_1$, to second signal comparator 238 that turns on second signal comparator 238. Also, mode selector 236 sends a "deassert" signal, $S_2$, to switch controller 234, which causes first switching unit 208 to open and thereby causes voltage supply circuit 200 to operate in a PFM (burst) mode.

Operating voltage supply circuit 200 in the PFM mode, second signal comparator 238 compares the value of the feedback voltage, $V_{FB}$, to the values of the first and second compensation threshold signals, $COMP_1$, $COMP_2$. If second signal comparator 238 determines that the value of the feedback voltage, $V_{FB}$, is less than the value of first compensation threshold signal, $COMP_1$, second signal comparator 238 sends an "assert" signal, $S_1$, to second switching unit 250, which causes second switching unit 250 to close and thereby connect offset voltage supply, $V_{OFS}$, in series with first reference voltage, $V_{REF1}$. Also, second signal comparator 238 sends the "assert" signal, $S_1$, to switch controller 234, which causes first switching unit 208 to close (e.g., utilizing the control signal "LOOP"). Consequently, if voltage supply circuit 200 is operated in the PFM mode, and the value of the feedback voltage, $V_{FB}$, is less than the value of the first compensation threshold signal, $COMP_1$, compensation circuit 212 (e.g., capacitors 214, 218 and resistor 216) is utilized to couple the feedback voltage, $V_{FB}$, from the first input of signal amplifier 206 to its output. Also, the voltage applied to the second input of signal amplifier 206 is increased from the value of the first reference voltage, $V_{REF1}$, to a value equal to the sum of the first reference voltage 220 and the offset voltage supply 252 (e.g., $V_{REF1}+V_{OFS}$).

With voltage supply circuit 200 operating in the PFM mode, if second signal comparator 238 determines that the value of the feedback voltage, $V_{FB}$, is greater than the value of the second compensation threshold signal, $COMP_2$, second signal comparator 238 sends out a "deassert" signal, $S_1$. The "deassert" signal, $S_1$, causes second switching unit 250 to open, which decouples the offset voltage supply, $V_{OFS}$, from the second input of signal amplifier 206. Also, the "deassert" signal, $S_1$, causes switch controller 234 to open first switching unit 208 utilizing the control signal, LOOP. Consequently, if voltage supply circuit is operated in the PFM mode, and the value of the feedback voltage, $V_{FB}$, is greater than the value of the second compensation threshold voltage, COMP2, compensation circuit 212 is not connected between the first input of signal amplifier 206 and its output. Also, the voltage applied to the second input of signal amplifier 206 is the first reference voltage, $V_{REF1}$ 220. Operating in the PFM mode, first switching unit 208 is opened and closed periodically, which refreshes the compensation loop (e.g., compensation circuit 212) coupled across signal amplifier 206 periodically and thereby minimizes the voltage variations at the node, COMP 209.

Figure 3:
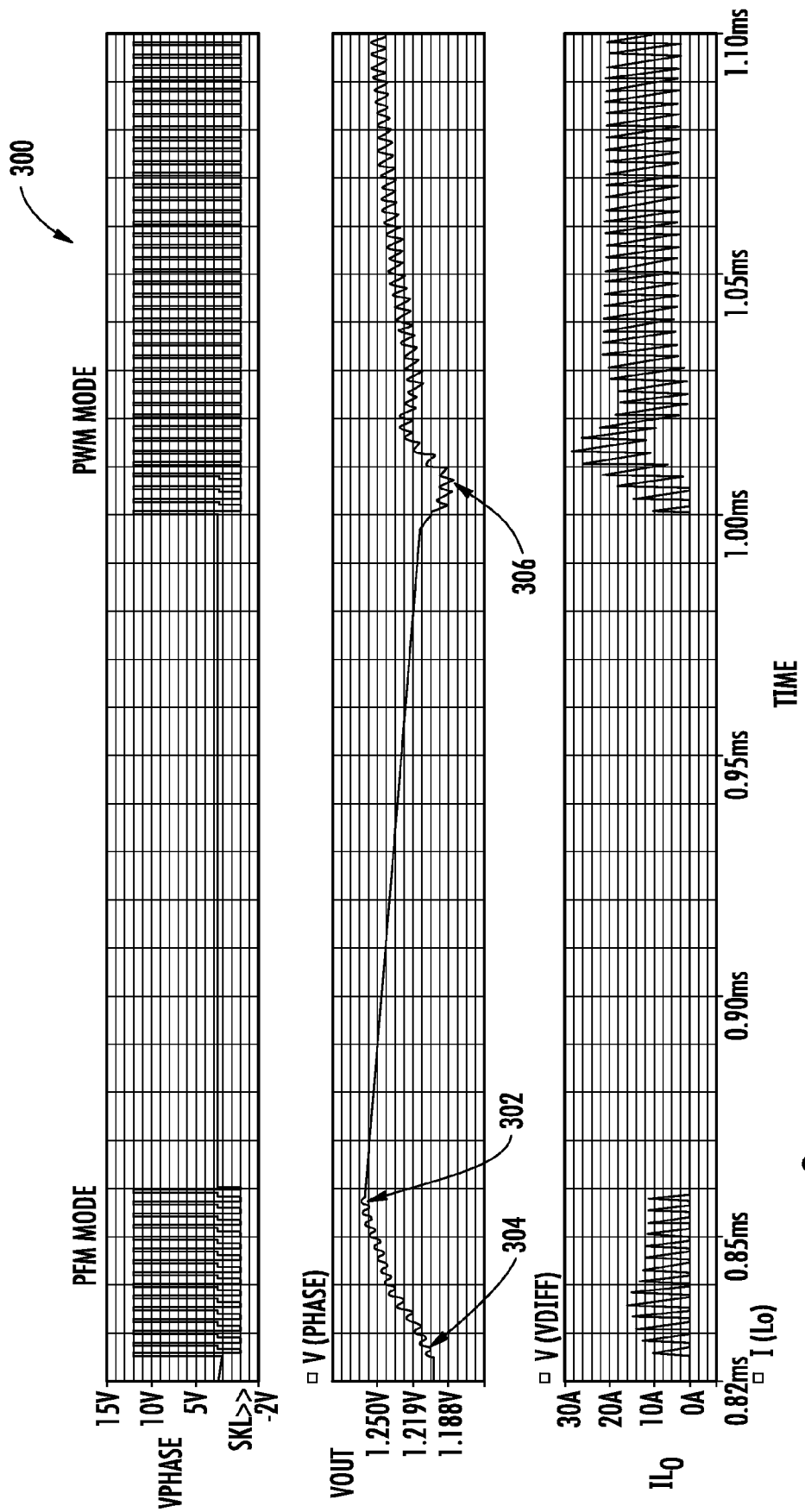
FIG. 3 is a pictorial diagram showing representative voltage and current waveforms associated with a voltage supply circuit transitioning between Pulse Frequency Modulation (PFM) and Pulse Width Modulation (PWM) modes of operation.

FIG. 3 is a pictorial diagram 300 showing representative voltage and current waveforms associated with voltage supply circuit 200 transitioning between PFM and PWM modes of operation. Specifically, diagram 300 illustrates variations of the output voltage, $V_{OUT}$, the phase voltage, $V_{PHASE}$, applied to inductor 270, and the current flow, $IL_0$, ($I_1$) through inductor 270 if voltage supply circuit 200 is operating in the PFM mode, and also as voltage supply circuit 200 transitions from the PFM mode to the PWM mode.

Referring to FIGS. 2 and 3, as indicated at 302, the compensation loop (e.g., formed by compensation circuit 212) from the negative input to the output of signal amplifier 206 is open (e.g., $V_{PHASE}$ is zero) when the value of the current, $IL_0$, through inductor 270 is less than the value of the PFM current threshold. Also, as indicated at 304, when the value of the output voltage, $V_{OUT}$, drops to a nominal value (e.g., approximately 1.20V in this example), inductor 270 is charged again (e.g., the value of $IL_0$ increases from 0 to 8 A at that time). Furthermore, as indicated at 306, when voltage supply circuit 200 is switched to the PWM mode, the transition from the PFM mode to the PWM mode is smooth, because the charges on the compensation capacitors 214, 218 remain stable for both modes of operation. Note that the small dip in the output voltage, $V_{OUT}$, is due to an inherent delay caused by the components of compensation circuit 212.

Figure 4:
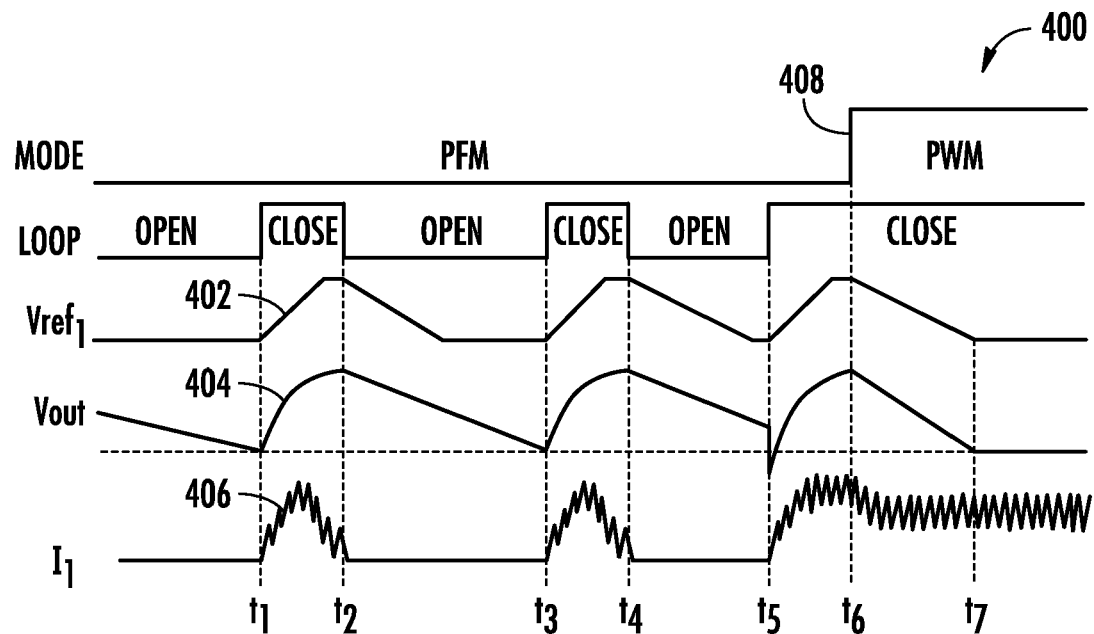
FIG. 4 is a pictorial diagram showing the timing of a plurality of signals associated with a voltage supply circuit transitioning between PFM and PWM modes of operation.

FIG. 4 is a pictorial diagram 400 showing the timing of a plurality of signals associated with voltage supply circuit 200 transitioning between PFM and PWM modes of operation. Referring to FIGS. 2 and 4, note that during the intervals between times $t_1$ and $t_2$, $t_3$ and $t_4$, and $t_5$ and $t_6$, voltage supply circuit 200 is operating in the PFM mode, and second signal comparator 238 outputs the control signal, $S_1$, that causes switch controller 234 to output the control signal, LOOP, which couples the compensation loop (e.g., utilizing compensation circuit 212) across signal amplifier 206. Also, the control signal, $S_1$, causes second switching unit 250 to close, which adds the offset voltage supply, $V_{OFS}$, (e.g., ramp) to the first reference voltage, $V_{REF1}$. Consequently, at 402, 404, and 406, respectively, the first reference voltage, $V_{REF1}$, the output voltage, $V_{OUT}$, and the inductor current, $I_1$, are shown increasing as a result. At time $t_6$, voltage supply circuit 200 is switched to operate in the PWM mode (at 408).

More precisely, at time $t_1$, the output voltage, $V_{OUT}$, is decreased to a nominal value, and a new closed-loop compensation interval is triggered. During the closed-loop compensation interval between times $t_1$ and $t_2$, the first reference voltage, $V_{REF1}$, is increased from the nominal value by the offset voltage supply, $V_{OFS}$, utilizing a relatively slow slew rate, and the output voltage, $V_{OUT}$, is increased under the control of the closed compensation loop. Note that at time $t_2$, the value of the inductor current, $I_1$, is less than the value of the predefined threshold signal. Consequently, the compensation loop is open during the next time interval (e.g., between times $t_2$ and $t_3$) while voltage supply circuit 200 continues to operate in the PFM mode. At time $t_6$, the value of the inductor current, $I_1$, is shown as being greater than the value of the predefined threshold signal, which causes voltage supply circuit 200 to switch to the PWM mode of operation.

Figure 5:
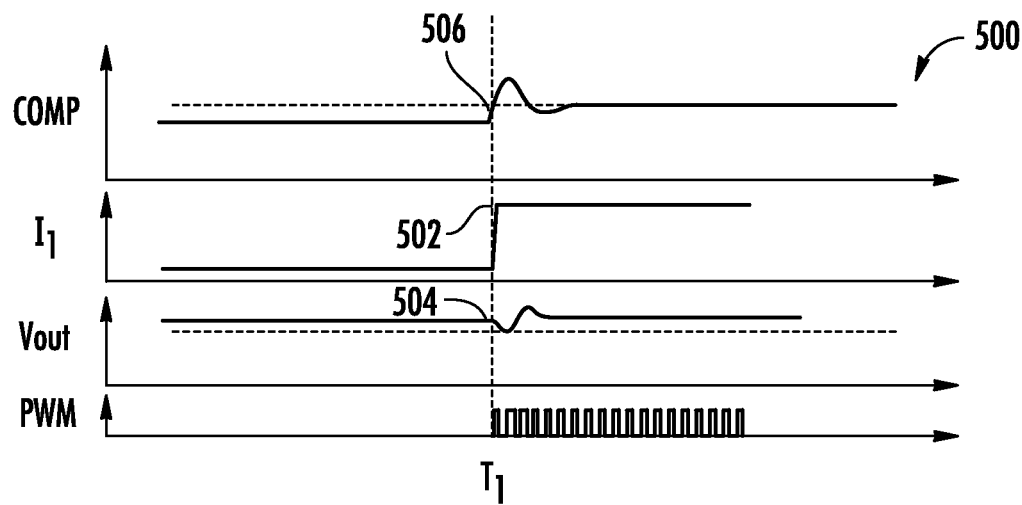
FIG. 5 is a pictorial diagram showing the timing of a second plurality of signals associated with a voltage supply circuit transitioning between PFM and PWM modes of operation.

FIG. 5 is a pictorial diagram 500 showing the timing of a second plurality of signals associated with voltage supply circuit 200 transitioning between PFM and PWM modes of operation. Specifically, referring to FIGS. 2 and 5, at time $T_1$, voltage supply circuit 200 is shown switching from the PWM mode to the PFM mode, and at 502, 504, and 506, respectively, the values of the inductor current, $I_1$, the output voltage, $V_{OUT}$, and the compensation voltage at the node, COMP 209 are shown. Note that the variations of the compensation voltage at the node, COMP 209 are relatively small.

Although specific embodiments have been illustrated and described herein, it will be appreciated by those of ordinary skill in the art that any arrangement that is calculated to achieve the same purpose, may be substituted for the specific embodiments shown. Therefore, it is intended that the present invention be limited only by the claims and the equivalents thereof.

What is claimed is:

1. A system, comprising:
   at least one electronic circuit; and
   a voltage supply unit coupled to an input of the at least one electronic circuit, the voltage supply unit including:
   a power unit to supply a voltage to the at least one electronic circuit; and
   a control unit to control an operating mode of the power unit, an output of the control unit coupled to an input of the power unit, the control unit including:
   a mode selector to select the operating mode of the power unit, coupled to at least a first output of the power unit;
   an amplifier coupled to the at least a first output of the power unit;
   a compensation circuit;
   a signal comparator coupled to the mode selector and the at least a first output of the power unit, to compare the at least a first output of the power unit to a threshold signal; and
   a first switching unit coupled to the mode selector, the signal comparator and the compensation circuit, to couple the compensation circuit to the amplifier if a selected operating mode of the power unit is a first mode, and a value of the at least a first output of the power unit is not equal to a value of the threshold signal.

2. The system of claim 1, wherein the first mode is a Pulse Frequency Modulation (PFM) mode.

3. The system of claim 1, wherein the at least a first output of the power unit is a voltage output.

4. The system of claim 1, wherein the mode selector is further coupled to a second output of the power unit.

5. The system of claim 1, wherein the mode selector is further coupled to a second output of the power unit, and the second output of the power unit is a current output.

6. The system of claim 1, wherein the first switching unit is enabled to decouple the compensation circuit from the amplifier if the selected operating mode is a Pulse Width Modulation (PWM) mode.

7. The system of claim 1, wherein the amplifier is further coupled to a reference voltage supply, and an output of the amplifier is a value associated with a difference between a value of the reference voltage supply and a value of the first output of the power unit.

8. The system of claim 1, wherein the voltage supply unit is implemented utilizing at least one Integrated Circuit (IC).

9. The system of claim 1, wherein the at least one electronic circuit is one or more of a Central Processing Unit (CPU), multiprocessor unit, Random Access Memory (RAM), Read Only Memory (ROM), hard drive, mass storage unit, display unit, Input/Output (I/O) unit, transmitting unit, receiving unit, Intermediate Frequency (IF) unit, signal processing unit, audio processor unit, data processor unit, communication bus, or rechargeable battery.

10. A voltage supply circuit, comprising:
    a power unit to output a Direct Current (DC) voltage, the power unit including an inductor and at least one transistor to charge or discharge the inductor; and
    a control unit to control an operating mode of the power unit, coupled to the at least one transistor, the control unit including:
    a mode selector to receive at least one of a voltage signal and a current signal associated with a current flow through the inductor, and select at least one of a Pulse Width Modulation (PWM) mode and a Pulse Frequency Modulation (PFM) mode of operation of the power unit responsive to the at least one of a voltage signal and a current signal;
    an amplifier to receive a reference voltage signal and the voltage signal, and output a signal associated with a difference between a value of the reference voltage signal and a value of the voltage signal;
    a compensation circuit to smooth a mode transition of the power unit to at least one of the PWM mode and the PFM mode;
    a signal comparator to receive the voltage signal and compare the voltage signal to a threshold signal, coupled to the mode selector; and
    a first switching unit coupled to the mode selector, the signal comparator and the compensation circuit, to couple the compensation circuit to the amplifier if a selected operating mode of the power unit is a first mode, and a value of the voltage signal is not equal to a value of the threshold signal.

11. The voltage supply circuit of claim 10, wherein the first mode is the PFM mode.

12. The voltage supply circuit of claim 10, wherein the voltage signal is a voltage feedback signal and the current signal is proportional to the current flow through the inductor.

13. The voltage supply circuit of claim 10, further comprising the signal comparator to receive the voltage signal and responsive to the voltage signal and the mode selector, couple and decouple the compensation circuit to and from the amplifier if the first mode is the PFM mode.

14. The voltage supply circuit of claim 10, wherein the at least one transistor is a Metal-Oxide Semiconductor Field Effect Transistor (MOSFET).

15. The voltage supply circuit of claim 10, wherein the voltage supply circuit is implemented utilizing a Complementary MOS (CMOS) manufacturing technology.

16. The voltage supply circuit of claim 10, wherein the voltage supply circuit is implemented in an IC.

17. The voltage supply circuit of claim 10, wherein a value of the voltage signal and a value of the current signal are associated with a value of an output load on the power unit.

18. The voltage supply circuit of claim 10, wherein the voltage supply circuit is a switching voltage regulator.

19. The voltage supply circuit of claim 10, wherein the voltage supply circuit is a switched-mode power supply.

20. A control unit for a voltage supply circuit, comprising:
    a mode selector to select an operating mode of the voltage supply circuit, coupled to a first output of the voltage supply circuit;
    an amplifier coupled to the first output of the voltage supply circuit;
    a compensation circuit;
    a signal comparator coupled to the mode selector and the first output of the voltage supply circuit, to compare the first output of the voltage supply circuit to a threshold signal; and
    a first switching unit coupled to the mode selector and the compensation circuit, to couple the compensation circuit to the amplifier if a selected operating mode of the voltage supply circuit is a first mode, and a value of the first output of the voltage supply circuit is not equal to a value of the threshold signal.

21. The control unit of claim 20, wherein the first mode is a PFM mode.

22. The control unit of claim 20, wherein the first output of the voltage supply circuit is a voltage output.

23. The control unit of claim 20, wherein the mode selector is further coupled to a second output of the voltage supply circuit.

24. The control unit of claim 20, wherein the mode selector is further coupled to a second output of the voltage supply circuit, and the second output of the voltage supply circuit is a current output.

25. The control unit of claim 20, wherein the first switching unit is enabled to decouple the compensation circuit from the amplifier if the selected operating mode is a PWM mode.

26. The control unit of claim 20, wherein the amplifier is further coupled to a reference voltage supply, and an output of the amplifier is a value associated with a difference between a value of the reference voltage supply and a value of the first output of the voltage supply circuit.

27. The control unit of claim 20, wherein the control unit is implemented utilizing an IC.

28. A method of controlling a voltage supply circuit, comprising:
    receiving a voltage signal and a current signal associated with a current flow through an inductor in the voltage supply circuit;
    selecting at least one of a PWM mode and a PFM mode of operation of the voltage supply circuit responsive to the voltage signal and the current signal;
    comparing the voltage signal with a threshold signal; and
    smoothing a transition of the voltage supply circuit to the PWM mode of operation if a value of the voltage signal is not equal to a value of the threshold signal.

29. The method of claim 28, further comprising:
    coupling a compensation circuit to the voltage supply circuit if the voltage supply circuit is operating in the PFM mode.

30. The method of claim 28, wherein the receiving, selecting and smoothing are performed in an IC.

* * * * *